US012673860B2

(12) United States Patent
Martino

(10) Patent No.: US 12,673,860 B2
(45) Date of Patent: Jul. 7, 2026

(54) APPARATUS FOR PIERCING A SEAL OF A LIQUID-FILLED CONTAINER

(71) Applicant: J-Sons Equipment Overhaul Inc., Kearny, NJ (US)

(72) Inventor: John M. Martino, Glen Gardner, NJ (US)

(73) Assignee: J-Sons Equipment Overhaul Inc., Kearny, NJ (US)

( * ) Notice: Subject to any disclaimer, the term of this patent is extended or adjusted under 35 U.S.C. 154(b) by 143 days.

(21) Appl. No.: 18/443,265

(22) Filed: Feb. 15, 2024

(65) Prior Publication Data

US 2025/0263281 A1 Aug. 21, 2025

(51) Int. Cl.
*B67B 7/00* (2006.01)

(52) U.S. Cl.
CPC .................................... *B67B 7/24* (2013.01)

(58) Field of Classification Search
CPC ....................................................... B67B 7/24
See application file for complete search history.

(56) References Cited

U.S. PATENT DOCUMENTS

| | | | | | |
|---|---|---|---|---|---|
| 3,538,866 | A * | 11/1970 | Gaines | A01M 1/2044 222/83.5 |
| 4,098,431 | A * | 7/1978 | Palmer | G03D 3/065 222/64 |
| 4,363,146 | A * | 12/1982 | Liautaud | A61H 35/02 4/620 |
| 4,411,661 | A | 10/1983 | Kersten | |
| 6,098,844 | A | 8/2000 | Nicolle | |
| 6,223,940 | B1 | 5/2001 | Quinn | |
| 7,654,413 | B2 | 2/2010 | Chang | |
| 9,327,955 | B2 | 5/2016 | Simpson | |
| 10,610,045 | B2 * | 4/2020 | Marina | B65D 41/04 |
| 2005/0017022 | A1 | 1/2005 | Faygenov | |
| 2015/0274499 | A1 * | 10/2015 | Simpson | B67C 11/02 141/332 |

FOREIGN PATENT DOCUMENTS

| | | | | | |
|---|---|---|---|---|---|
| BR | MU8501080 | U | 1/2007 | |
| CA | 2223697 | A1 | 8/1999 | |
| CN | 205187816 | U | 4/2016 | |
| CN | 207451600 | U | 6/2018 | |
| CN | 210992024 | U | 7/2020 | |
| JP | 2010202273 | A | 9/2010 | |
| RU | 2018127400 | A | 1/2020 | |
| WO | WO-2012086381 | A1 * | 6/2012 | B41J 2/17559 |
| WO | WO-2017091643 | A1 * | 6/2017 | A61J 1/2075 |

* cited by examiner

*Primary Examiner* — Jeremy Carroll
(74) *Attorney, Agent, or Firm* — Moser Taboada

(57) ABSTRACT

Embodiments of adapters for emptying liquid-filled containers are provided herein. In some embodiments, an adapter for emptying a liquid-filled container includes: an annular ring configured to at least partially be disposed in an opening of the liquid-filled container; one or more spokes extending at least partially across a central opening of the annular ring; and a protrusion extending from the one or more spokes to a location vertically above the annular ring and configured for piercing a seal of the liquid-filled container.

20 Claims, 4 Drawing Sheets

APPARATUS FOR PIERCING A SEAL OF A LIQUID-FILLED CONTAINER

FIELD

Embodiments of the present disclosure generally relate to an apparatus for piercing a seal of a liquid-filled container.

BACKGROUND

Fluids for use in various applications such as for automotive, agricultural, and industrial applications are often packaged in sealed containers to prevent tampering and leakage or evaporation. The seal of the sealed containers may include a protective film that covers an opening of the container. During use, a user needs to remove or pierce the protective film in order to empty the fluid in the container. However, some protective films are difficult to remove. The user also needs to hold the container and aim the fluids into an opening or spout of a receiving storage vessel. However, such a process requires a user to continuously hold the container and often leads to spillage or splashing of the fluids outside of the storage vessel.

Accordingly, the inventors have provided herein embodiments of improved adapters for emptying liquid-filled containers.

SUMMARY

Embodiments of adapters for emptying liquid-filled containers are provided herein. In some embodiments, an adapter for emptying a liquid-filled container includes: an annular ring configured to at least partially be disposed in an opening of the liquid-filled container; one or more spokes extending at least partially across a central opening of the annular ring; and a protrusion extending from the one or more spokes to a location vertically above the annular ring and configured for piercing a seal of the liquid-filled container.

In some embodiments, an adapter for emptying a liquid-filled container includes: an annular ring configured to at least partially be disposed in an opening of the liquid-filled container; one or more spokes extending across a central opening of the annular ring from a first location of the annular ring diametrically opposed to a second location of the annular ring; and a protrusion extending from the one or more spokes to a location vertically above the annular ring and configured for piercing a seal of the liquid-filled container, wherein a lower surface of the one or more spokes is substantially flush with a lower surface of the annular ring.

In some embodiments, a storage vessel includes: a vessel body configured for storing a liquid and having an opening for receiving the liquid; and an adapter at least partially disposed in the opening, the adapter comprising: an annular ring; one or more spokes extending at least partially across a central opening of the annular ring; and a protrusion extending from the one or more spokes to a location vertically above the annular ring and configured for piercing a seal of a liquid-filled container.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
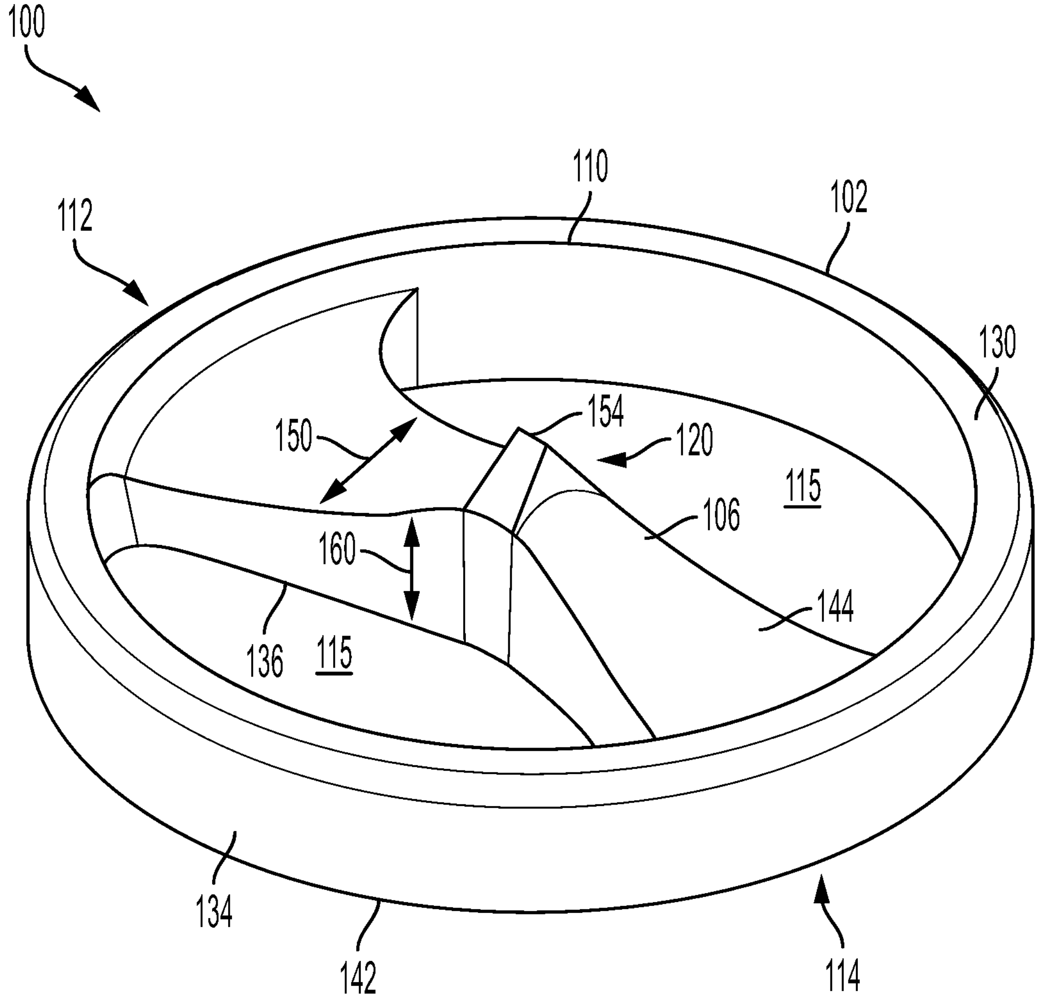
FIG. 1 depicts an isometric view of an adapter for emptying a liquid-filled container in accordance with at least some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of adapters for emptying a liquid-filled container are provided herein. The adapters are generally configured to be removably disposed in an opening of a storage vessel or integrated with the storage vessel. The adapter generally includes a protrusion configured for piercing a seal of the liquid-filled container. Once the seal is pierced, the liquid from the liquid-filled container begins to flow into the storage vessel. The adapter advantageously facilitates piecing or puncturing the seal. The adapter may also advantageously aid in supporting the liquid-filled container over the storage vessel to facilitate ease of flowing liquid from the liquid-filled container to the storage vessel and reduced handling for a user. With the support provided by the adapter or adapter in combination with the storage vessel, the adapter may advantageously promote one handed emptying of the liquid-filled container. With the support provided by the adapter or adapter in combination with the storage vessel, the liquid-filled container may advantageously be emptied without user support.

Figure 2:
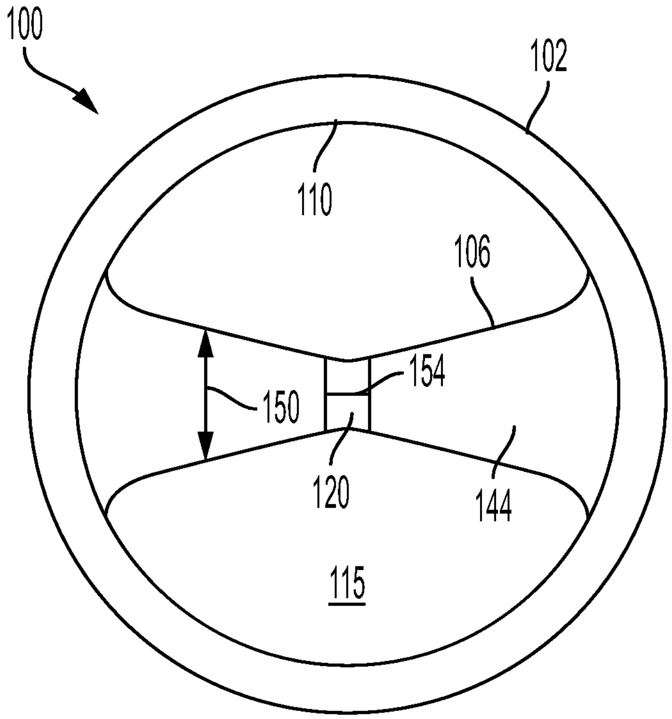
FIG. 2 depicts a top view of an adapter disposed in a storage vessel in accordance with at least some embodiments of the present disclosure.

FIG. 1 depicts an isometric view of an adapter for emptying a liquid-filled container in accordance with at least some embodiments of the present disclosure. FIG. 2 depicts a top view of an adapter for emptying a liquid-filled container in accordance with at least some embodiments of the present disclosure. The adapter 100 includes an annular ring 102 configured to at least partially be disposed in an opening of the liquid-filled container (see FIG. 2). The annular ring 102 may include rounded edges at an interface between an upper surface 130 of the annular ring 102 and an outer sidewall 134 of the annular ring 102. In some embodiments, the annular ring 102 has an outer diameter of about 1 to about 3 inches.

The adapter 100 includes one or more spokes 106 extending from the annular ring 102 and at least partially across a central opening 110 of the annular ring 102. In some embodiments, the one or more spokes 106 comprise two spokes that are diametrically opposed to each other and connect such that together, the two spokes extend across the central opening 110 from a first location 112 of the annular ring 102 diametrically opposed to a second location 114 of the annular ring 102. In some embodiments, the one or more spokes 106 comprise an even number of spokes (e.g., four spokes) that connect in the central opening 110. In some embodiments, the one or more spokes 106 comprise an odd number of spokes (e.g., three spokes) that connect in the central opening 110, where the spokes extend from locations along the annular ring 102 that are not diametrically opposed.

In some embodiments, the one or more spokes 106 and the annular ring 102 define at least two openings 115 through the adapter 100. In some embodiments, a lower surface 136 of the one or more spokes 106 is substantially flush with a lower surface 142 of the annular ring 102. In some embodiments, the lower surface 136 of the one or more spokes 106 is disposed above or substantially flush with the lower surface 142 of the annular ring 102 (e.g., the lower surface 136 does not extend beyond the lower surface 142).

The adapter 100 includes a protrusion 120 extending from the one or more spokes 106 to a location vertically above the annular ring 102 and configured for piercing a seal of the liquid-filled container. In some embodiments, the protrusion 120 is disposed at a center of the annular ring (i.e., centrally located in the central opening 110). In some embodiments, the protrusion 120 is offset from the center of the annular ring. In some embodiments, the protrusion 120 has a sharp edge 154 to facilitate puncturing a seal of a liquid-filled container. The adapter 100 is made of a material such as polymer, metal, wood, or the like.

In some embodiments, a width 150 of the one or more spokes 106 varies across the central opening 110. In some embodiments, the one or more spokes 106 decrease in width from the first location 112 to the protrusion 120 and increase in width from the protrusion 120 to the second location 114. In some embodiments, a height 160 of the one or more spokes 106 varies across the central opening 110. In some embodiments, the lower surface 136 of the one or more spokes is substantially flat. In some embodiments, an upper surface 144 of the one or more spokes 106 extends upwards so that the one or more spokes 106 increase in height from the first location 112 to the protrusion 120 and the second location 114 to the protrusion 120. In some embodiments, the upper surface 144 of the one or more spokes 106 at the first location 112 and the second location 114 is disposed below an upper surface 130 of the annular ring 102. In some embodiments, the upper surface 144 of the one or more spokes 106 at the first location 112 and the second location 114 is disposed sufficiently below an upper surface 130 of the annular ring 102 to facilitate supporting a mouth of a container having a diameter smaller than the inner diameter of the annular ring 102 such that the container can be maintained in position by resting against the inner sidewall of the annular ring 102.

Figure 3:
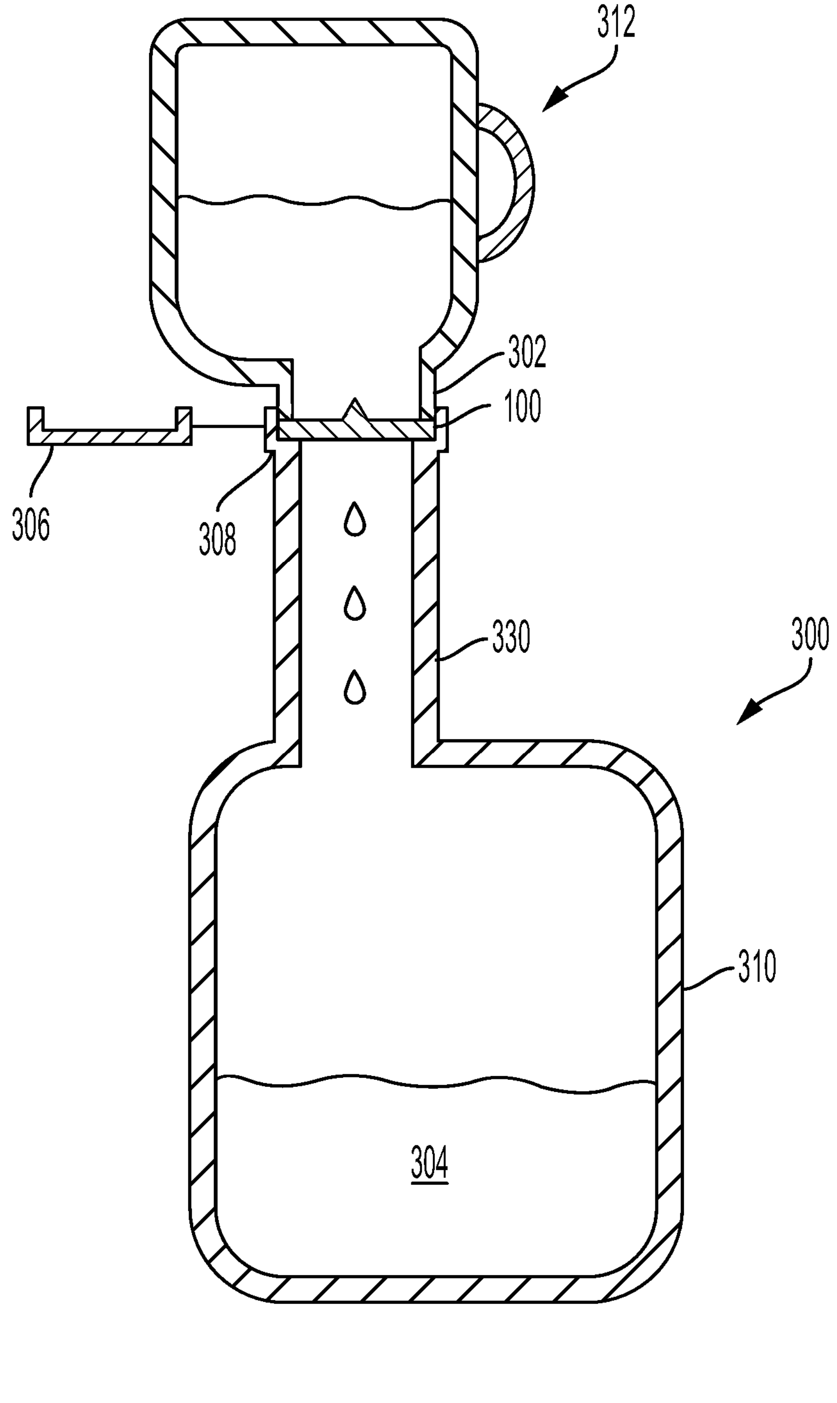
FIG. 3 depicts a schematic side view of a storage vessel with an adapter for emptying a liquid-filled container in accordance with at least some embodiments of the present disclosure.

FIG. 3 depicts a schematic isometric view of an adapter disposed in a storage vessel in accordance with at least some embodiments of the present disclosure. A storage vessel 300 includes a vessel body 310 configured for storing a liquid 304 and having an opening 302 for receiving the liquid 304. The vessel body 310 may have any suitable size or shape for storing the liquid 304. For example, the storage vessel 300 may be a windshield fluid reservoir that may be attached to a vehicle such as a car or truck.

In some embodiments, the vessel body 310 includes a mouth 330 adjacent to the opening 302. In some embodiments, the mouth 330 includes a ledge 308 so that the adapter may rest on the ledge 308. In some embodiments, the storage vessel 300 includes a cap 306 configured to close the opening 302. The cap 306 may be press fit, screwed onto, or removably attached to the vessel body 210 via any suitable manner. In some embodiments, the adapter 100 is entirely disposed in the vessel body 210. In some embodiments, the adapter 100 may be integrally formed or coupled to the vessel body 210. In some embodiments, the lower surface 142 of the adapter 100 or the outer sidewall 134 of the adapter 100 includes an adhesive to aid in attaching the adapter 100 to the vessel body 310.

In use, a user can flip a liquid-filled container 312 (e.g., windshield wiper fluid, a cleaning fluid, motor oil, anti-freeze, or the like) onto the adapter 100 at least partially disposed in the storage vessel 300. The protrusion 120 of the adapter 100 is configured to puncture a seal of the liquid-filled container 312, which automatically begins the flow of the liquid from the liquid-filled container 312 into the storage vessel 300. In some embodiments, the user can simply help balance the liquid-filled container 312 with one hand while the storage vessel 300 is being filled, instead of conventional manners in filling such a storage vessel 300, which comprises manually puncturing the seal and then aiming the fluid into the mouth 330 of the storage vessel 300. In some embodiments, once placed on the adapter 100, the sidewalls of the adapter 100 and/or the sidewalls of the mouth 330 can support the liquid-filled container 312 entirely so that the liquid-filled container 312 may be emptied into the vessel body 310 without support by the user. The adapter 100 advantageously allows for easier refilling of storage vessels 300 with reduced spillage.

Figure 4:
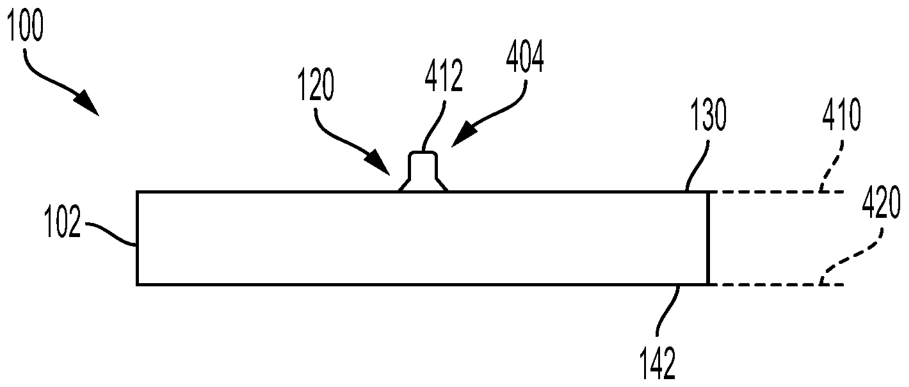
FIG. 4 depicts a side view of an adapter for emptying a liquid-filled container in accordance with at least some embodiments of the present disclosure.
Figure 5:
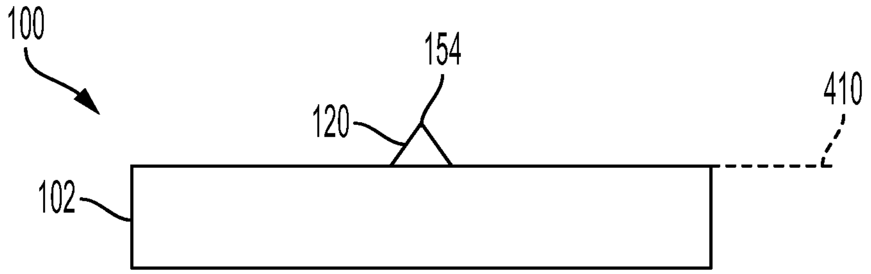
FIG. 5 depicts a side view of an adapter for emptying a liquid-filled container in accordance with at least some embodiments of the present disclosure.

FIGS. 4 and 5 depict a side view of an adapter for emptying a liquid-filled container in accordance with at least some embodiments of the present disclosure. The one or more spokes 106 generally extend vertically above a horizontal plane 410 along an upper surface 130 of the annular ring 102. For example, the protrusion 120 of the one or more spokes 106 extends vertically above the horizontal plane 410. In some embodiments, the one or more spokes 106 extend vertically to or above a horizontal plane 420 extending along the lower surface 142 of the annular ring 102. In other words, the one or more spokes 106 may entirely be disposed vertically above the horizontal plane 420. In some embodiments, the one or more spokes 106 are entirely disposed between the horizontal plane 410 and the horizontal plane 420 except for the protrusion 120.

In some embodiments, as depicted in FIG. 4, the protrusion 120 includes a blunt portion 404. The blunt portion 404 may include a blunt edge or a rounded edge that interfaces with the liquid-filled container 312 when disposed thereon. In some embodiments, an upper surface 412 of the protrusion 120 is substantially flat. In some embodiments, as depicted in FIG. 5, the upper surface 412 of the protrusion 120 includes the sharp edge 154. In some embodiments, the protrusion 120 includes a triangular cross-sectional shape. In some embodiments, the protrusion 120 is pyramidal in shape.

While the foregoing is directed to embodiments of the present disclosure, other and further embodiments of the disclosure may be devised without departing from the basic scope thereof.

The invention claimed is:

1. An adapter for emptying a liquid-filled container, comprising:

an annular ring configured to be in direct contact with the liquid-filled container and to be at least partially disposed in an opening of the liquid-filled container;

a protrusion disposed in a central opening of the annular ring; and one or more spokes extending radially outward from the protrusion to the annular ring, wherein the protrusion is directly coupled to the one or more spokes and extends to a location vertically above the annular ring and is configured for piercing a seal of the liquid-filled container.

2. The adapter of claim 1, wherein the one or more spokes extend vertically to or above a horizontal plane extending along a lower surface of the annular ring.

3. The adapter of claim 1, wherein a width of at least one of the one or more spokes varies across the central opening.

4. The adapter of claim 1, wherein the adapter includes through openings adjacent the annular ring and the one or more spokes.

5. The adapter of claim 1, wherein the adapter is made of a polymer, metal, or wood.

6. The adapter of claim 1, wherein the annular ring has an outer diameter of about 1 to about 3 inches.

7. The adapter of claim 1, wherein the protrusion is disposed at a center of the annular ring.

8. The adapter of claim 1, wherein the protrusion includes a sharp edge or rounded edge.

9. The adapter of claim 1, wherein the one or more spokes consist of two spokes that are diametrically opposed and connect in the central opening.

10. An adapter for emptying a liquid-filled container, comprising:

an annular ring configured to at least partially be disposed in an opening of the liquid-filled container;

one or more spokes extending linearly and continuously across a central opening of the annular ring from a first location of the annular ring diametrically opposed to a second location of the annular ring; and a protrusion extending from the one or more spokes to a location vertically above the annular ring and configured for piercing a seal of the liquid-filled container, wherein a lower surface of the one or more spokes is substantially flush with a lower surface of the annular ring, and wherein each of the one or more spokes decrease in width and increase in height from the first location to the protrusion.

11. The adapter of claim 10, wherein the one or more spokes consist of two spokes.

12. The adapter of claim 10, wherein the lower surface of the one or more spokes is substantially flat, and an upper surface extends upwards so that the one or more spokes increase in height from the first location to the protrusion.

13. The adapter of claim 10, wherein an upper surface of the one or more spokes at the first location and the second location is disposed below an upper surface of the annular ring.

14. The adapter of claim 10, wherein the one or more spokes and the annular ring define exactly two openings through the adapter.

15. A storage vessel, comprising:

a vessel body configured for storing a liquid and having an opening for receiving the liquid; and an adapter configured to be in direct contact with the vessel body and to be at least partially disposed in the opening, the adapter comprising:

an annular ring;

one or more spokes extending at least partially across a central opening of the annular ring; and a protrusion extending vertically above the one or more spokes to a location vertically above the annular ring and configured for piercing a seal of a liquid-filled container.

16. The storage vessel of claim 15, wherein a width of each of the one or more spokes varies across the central opening, and wherein a height of each of the one or more spokes varies across the central opening.

17. The storage vessel of claim 15, wherein the storage vessel is a windshield fluid reservoir.

18. The storage vessel of claim 15, further comprising a cap configured to close the opening, and wherein the adapter is entirely disposed in the vessel body.

19. The storage vessel of claim 15, wherein the vessel body include a mouth adjacent to the opening and the mouth includes a ledge, wherein the adapter is configured to rest on the ledge.

20. The storage vessel of claim 15, wherein a lower surface of the one or more spokes is substantially flat, and an upper surface of the one or more spokes extends upwards so that the one or more spokes increase in height from the annular ring to the protrusion.

* * * * *